Figure 1:
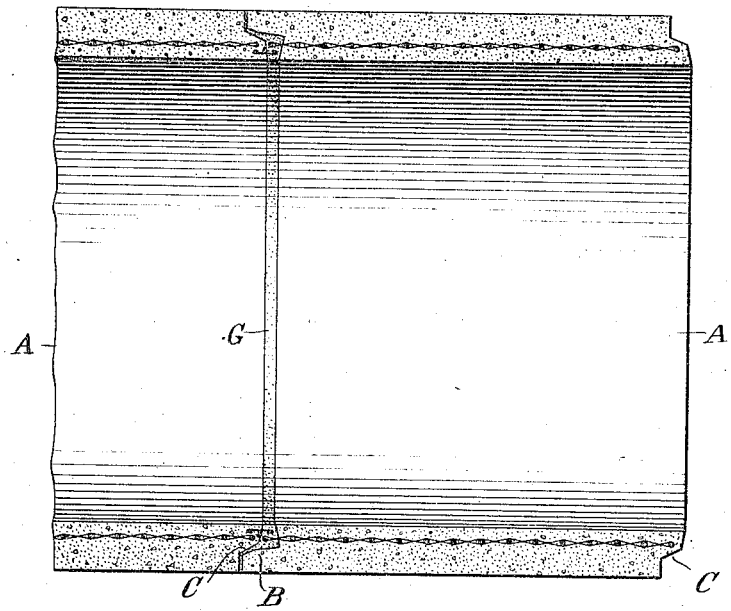

A. M. HIRSH, C. MERIWETHER & J. C. MITCHELL.
EXPANSION JOINT FOR CONCRETE WATER PIPES.
APPLICATION FILED JAN. 26, 1914.

1,151,949.

Patented Aug. 31, 1915.

UNITED STATES PATENT OFFICE.

ALLAN M. HIRSH AND COLEMAN MERIWETHER, OF MONTCLAIR, AND JOHN C. MITCHELL, OF EAST ORANGE, NEW JERSEY, ASSIGNORS TO LOCK JOINT PIPE COMPANY, OF NEW YORK, N. Y., A CORPORATION OF NEW JERSEY.

EXPANSION-JOINT FOR CONCRETE WATER-PIPES.

1,151,949.  Specification of Letters Patent.  Patented Aug. 31, 1915.

Application filed January 26, 1914. Serial No. 814,341.

*To all whom it may concern:*

Be it known that we, ALLAN M. HIRSH and COLEMAN MERIWETHER, residing at Montclair, and JOHN C. MITCHELL, residing at East Orange, all in the county of Essex and State of New Jersey, have invented certain new and useful Improvements in Expansion-Joints for Concrete Water-Pipes, of which the following is a full, clear, and exact description, reference being had to the drawings accompanying and forming a part of the same.

This invention is an improvement in concrete pipes which are designed to stand an internal pressure and consists of a novel form of water tight expansion joint for the abutting sections of such a structure.

The efforts to secure such a joint for pipes of this character have led to a vast amount of experiment and involved a very large expense. If properly made, the concrete of which the sections are composed is virtually water tight under even very high pressure, but no practicable means has ever been devised, so far as we know, by which the joints of such a pipe can be made to resist the leakage of water when the pipes are exposed to ordinary conditions of actual use. Cement or concrete gradually contracts for a long period after manufacture and installation. This has a tendency to weaken or impair the joints in a pipe line after its completion, and particularly when under pressure. Water will flow freely through the cracks, which are too small to be detected by the naked eye. It is, moreover, almost impossible in practice to lay such pipe on foundations so stable that there is no settling or upheaval of the same with a resultant bending of the pipe and impairment of the joints, which latter are obviously the weakest points in the line. We have conducted a very extensive and elaborate series of experiments with such pipes, with a view to obviating these objections, and have produced a form of expansion joint which is absolutely water tight under all conditions of internal or external pressure to which such pipes are likely to be subjected, which is simple in construction, inexpensive and highly efficient.

Specifically, stated, this invention is as follows: The sections of pipe are formed in molds of a suitable quality of concrete, each section being made with a spigot at one end and a bell at the other, the bell being slightly longer than the spigot, so that when the said sections are assembled an annular groove or recess will be formed on the interior of the pipe between the extremity of the spigot and the base of the bell. In practice, such pipe sections are molded with a reinforcing material, generally in the form of a wire netting or sheet of expanded metal embedded therein, which extends beyond the body of concrete at both ends and which overlaps in the groove or recess. The latter, after the sections are brought into abutting contact, is then filled with cement, cement mortar or concrete, to form a smooth interior wall and to unite the reinforcements of adjacent sections. This construction is illustrated in patent to Coleman Meriwether, No. 894,517, of July 28, 1908.

According to our present invention, we cast or mold in each section of pipe at the spigot end thereof and so as to project from the extreme end of the spigot, a cylinder of metal, preferably copper, having a circumferential fold or crimp that is embedded in the end of the spigot. When two sections of pipe thus constructed are brought into abutting contact, the outer or uncovered end of this cylinder extends into the groove or recess between the two pipes, and when this groove is filled with cement, or cement mortar, the copper band or cylinder is embedded therein and forms a water-tight union between the two sections, which is capable of expansion without impairment of its waterproofing properties.

In practice, the ends or edges of the copper cylinder are ribbed, crimped or folded over, in order to anchor the metal in the concrete of the pipe section and cement of the joint, and in order that the weakest point of the joint may be at the proper point with respect to the copper cylinder, the end or face of the spigot, prior to the assembling of the sections, is coated or painted with asphaltum, or any equivalent substance to which the cement filling for the groove will not adhere with the same tenacity that it does to the rough concrete surface of the bell.

The joint thus made, we have found to be of the greatest practical value. In service and under conditions of actual use, we have found that a separation of a quarter of an inch between two adjacent pipe sections does not impair in any way the integrity, nor water tight properties of the joint, and this is true in pipes of the largest size, the joint having proved entirely satisfactory in pipes seven feet or more in diameter.

In the drawing hereto annexed, we have illustrated the improved joint as applied to the particular form of pipe above described.

Figure 2:
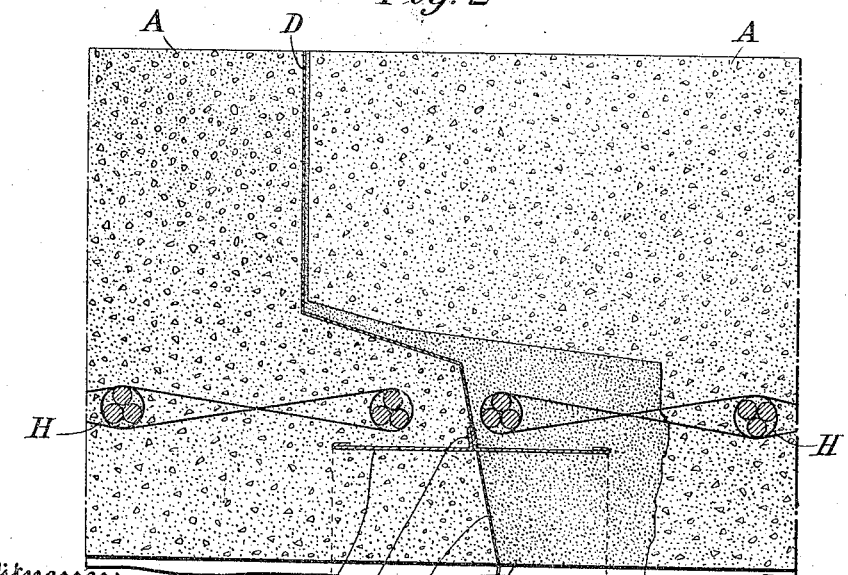

Figure 1 is a view in longitudinal section of a portion of a line of pipe, and Fig. 2 is an enlarged sectional detail of the joint.

The several pipe sections are indicated by the letters A. Each section is formed or molded with a bell B at one end and a spigot C at the other. The bell being somewhat longer than the spigot it forms an annular groove or recess around the interior of the pipe.

E is the cylinder or band of copper or other suitable non-oxidizable metal, formed with a crimp or fold F, which, preferably, lies embedded in the face or end of the spigot. The cylinder, during the process of molding, is cast in the spigot ends so that its free end extends out into the recess. The face of the spigot has a coating of asphaltum or other like material D, and the surface of the bell is preferably roughened somewhat so that the cement filling G for the recess will take a firm hold upon it. It is almost invariably necessary to reinforce these pipes, for which purpose they are molded with steel rods or fabric H, embedded in them. When this is done, we allow the rods or fabric to project from the bell end only, in which case it becomes embedded in the cement filler for the groove, as shown in the drawings.

In practice, the joint above described may be used between every two adjacent sections, or between every other two, or, in general, as the character of the work may demand. For example, a proper water tight joint may be used in every other union between the sections and this expansion joint used in the intermediate unions, to take care of the expansion and contraction of the pipe lines. In this system of construction when the copper cylinder is omitted from any section any proper form of joint may be used in its place.

It is hardly necessary to state that the invention is not limited to the specific form of pipe herein illustrated and described, but comprises the features set forth in whatever form of pipe they may be embodied.

Having now described our invention, what we claim is:

1. An expansion joint for concrete pressure pipes, formed by the combination of two abutting sections of pipe having a bell and spigot union, the bell end being longer, so as to form an annular recess or groove, a cylinder of imperforate metal embedded in and extending out from the spigot end having a fold or crimp therein, the expansible portion of which rests against the surface of the spigot end and a filling of concrete or cement for the groove embedding therein the projecting end of the cylinder and the crimp or fold therein.

2. An expansion joint for concrete pressure pipes, formed by the combination of two abutting sections of pipe, having a bell and spigot union, the bell being longer, so as to form an annular recess or groove in the interior, and the spigot end having a coating of asphaltum, a cylinder of imperforate metal embedded in and extending into the groove from the spigot end having a fold or crimp therein, the expansible portion of which lies against the coated surface of the spigot end and a filling of concrete or cement for the groove.

3. An expansion joint for concrete pressure pipes, formed by the combination of two abutting sections of pipe, having a bell and spigot union, the bell end being longer, so as to form an annular groove or recess and the spigot end having a coating of asphaltum, an imperforate cylinder of copper embedded in the spigot end and extending into the groove having a fold or crimp therein, the expansible portion of which rests against the coated surface of the spigot end, and a filling of concrete or cement for the groove embedding therein the projecting end of the copper cylinder and the fold or crimp therein.

4. An expansion joint for concrete pressure pipes, formed by the combination of two abutting pipe sections having a bell and spigot union, in which one of the elements is longer than the other, so that an annular groove or recess is formed, an imperforate metallic cylinder embedded in and extending from the shorter element into the groove having a fold or crimp therein, the expansible portion of which rests against the end surface of said shorter element and a filling of concrete or cement for the groove in which the projecting end of the cylinder and the fold or crimp therein are embedded.

5. An expansion joint for concrete pressure pipes, formed by the combination of two abutting pipe sections having a bell and spigot union, in which one of the elements is shorter than the other to form an annular groove at the joint, an imperforate cylinder of copper embedded in and extending from the shorter element having a fold or crimp therein which rests against the said shorter element, a coating of asphaltum for the face of the said shorter element, and a filling of concrete or cement for the groove, in which the projecting end of the cylinder and the crimp or fold therein are embedded.

6. An expansion joint for concrete pressure pipes, formed by the combination of two abutting pipe sections having an annular groove or recess at the line of union, an imperforate cylinder of metal embedded in and projecting from one pipe section into said groove having a fold or crimp therein, the expansible portion of which rests against the end surface of one of the pipe sections and a filling of concrete or cement for the groove in which the projecting end of the cylinder and the fold or crimp therein are embedded.

7. An expansion joint for concrete pressure pipes, formed by the combination of two abutting pipe sections having an annular groove or recess at the line of union, an imperforate copper cylinder embedded in and projecting from the end of one section into the groove having a fold or crimp therein, the expansible portion of which lies against the surface of one of the said pipe sections, a coating of asphaltum for the end of the said section, and a filling of concrete or cement for the groove in which the projecting end of the cylinder and the crimp or fold therein are embedded.

8. An expansible joint for concrete pressure pipes, formed by the combination of two abutting pipe sections having a groove at the line of union, an imperforate cylinder of metal embedded in and extending from one section into the groove having a fold or crimp therein, the expansible portion of which rests against the surface of one of the said pipe sections, a coating of asphaltum on the end of the said section, a filling of concrete or cement for the groove, and reinforcing metal extending from the uncoated section into the said filling of concrete.

9. An expansion joint for concrete pressure pipes, formed by the combination of two abutting pipe sections, having a groove at the line of union, an imperforate cylinder of metal embedded in and extending from one section into the groove having a fold or crimp therein, the expansible portion of which rests against one of the said pipe sections, and having folds or crimps at its embedded ends to form anchors, and a filling of concrete or cement for the groove in which the projecting end of the cylinder and the folds or crimps therein are embedded.

In witness whereof we affix our signatures in the presence of two subscribing witnesses.

ALLAN M. HIRSH.
COLEMAN MERIWETHER.
JOHN C. MITCHELL.

Witnesses:
M. LAWSON DYER,
THOMAS J. BYRNE.